Patented Aug. 2, 1932

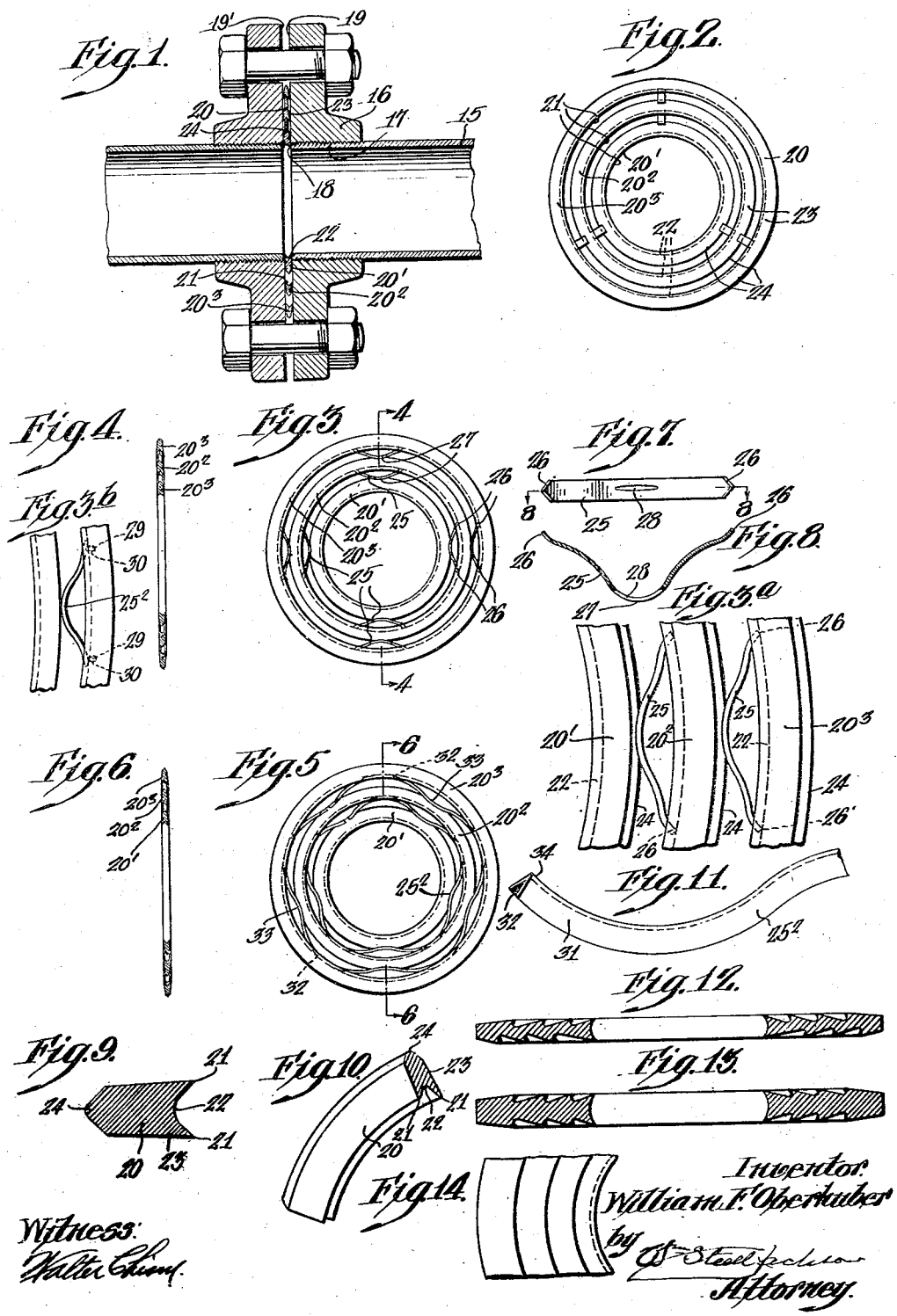

1,869,577

UNITED STATES PATENT OFFICE

WILLIAM F. OBERHUBER, OF LANSDOWNE, PENNSYLVANIA

COMPOSITE DISK SEAL

Application filed April 8, 1926. Serial No. 100,558.

My invention relates to fluid-tight joints for preventing leakage between adjoining sections of pipe or between pipe sections and fittings of various characters.

The purpose of my invention is to form a seal by a composite disk made up of separable sealing elements.

A further purpose is to apply concentric sealing elements of different diameters and generally in the same planes and to space them from each other so as to make them effective in practice as if they comprise but a single piece.

A further purpose is to so form separate annuli of a composite disk, or the spacers or both as to avoid separation of the parts when they expand under high temperature conditions of use.

A further purpose is to interfit concentric sealing rings and spacers of a composite sealing disk.

A further purpose is to locally or generally convex or concave adjoining sealing elements on the circumferential surfaces facing each other, preferably convexing one and concaving the other, so that a spacer may be retained upon the convexity or within the concavity.

I have preferred to illustrate my invention by but one main type and slight modifications, selecting a type which is practical, efficient, easy to manufacture and capable of long life and which at the same time well illustrates the principles of my invention.

Figure 1 is a central longitudinal cross section of piping and a joint to which latter my invention is applied.

Figure 2 is an elevation of the sealing element shown in Figure 1.

Figure 3 is an elevation, shown in fragmentary enlarged form in Figure 3a with a modification in Figure 3b, of a slightly modified form of the structure seen in Figure 1.

Figure 4 is a section of Figure 3 upon line 4—4.

Figure 5 is an elevation of a further slightly modified form of the invention seen in Figures 2 and 3.

Figure 6 is a section of Figure 5 upon line 6—6.

Figures 7 and 8 are an enlarged elevation and section thereof on line 8—8 showing a spacer illustrated in Figure 3.

Figure 9 is an enlarged section and Figure 10 is an enlarged perspective showing details of the sealing disks illustrated.

Figure 11 is a fragmentary perspective of a spacer which may be used in the structure of Figure 5.

Figures 12 and 13 are sections of sealing disks in a single piece with which the composite disk of the other figures are comparable.

Figure 14 is a reduced scale fragmentary face view true of the disks of each of Figures 12 and 13.

In the drawing similar numerals indicate like parts.

In joints of flanged sections of steel or wrought iron pipe, one section to another or to the flanges of fittings such as valves, elbows, T's, etc., though the fitting flange may be and usually is continuous to the interior, the pipe and its flange are not continuous but are made up of the separate pipe such as 15 and its flange 16 united to it by threads 17 and usually united also by welding at the threads. The pipe may be extended through to substantially in line with the face of the flange and may be faced off at 18 in line with the flange whether the face 19 of the flange lie wholly within a plane or for any special purpose be slightly coned or relieved from said plane. Notwithstanding that some spring in the flange makes it desirable that the flange face 19 of one meeting member and the flange face 19' of the companion meeting member, be it pipe flange or fitting, shall initially slightly diverge outwardly so as to be parallel when the bolts have been tightened, these two faces lie nearly enough parallel so that I shall treat them as parallel faces throughout the general discussion of this subject. Moreover, notwithstanding that they need not be substantially plane surfaces but that one can be slightly concave and the other slightly convex to secure a good joint, I shall for convenience, treat these meeting faces as plane in the general treatment of the case and as plane where the contacts are being made, in any event.

My invention is advantageous in joints for a great variety of fluids, being of special value as the difficulty of retaining the fluid increases by reason of the pressure or the unusual difficulty of holding that particular fluid or character of fluid.

In Figure 1 I have selected for illustration the joint between two flanged pipe sections because this is more difficult to seal than a joint between a flanged pipe and the flange of a fitting. The pipe sections present faces on both sides interrupted by the threading whereas the joint with the flange of a fitting presents this interruption on one meeting face only.

For each joint I supply a plurality of concentric annular sealing rings, 20, exemplified in rings $20'$, $20^2$ and $20^3$, which lie substantially in the same planes and each of which seals on both sides at its edge 21. The innermost ring is shown as sealing against the end of the pipes. Each of these rings 20 is under-cut at 22 on the circumferential face toward the pressure, i. e., on the inner circumference in the present case, and is relieved from a point near the edge 21 as at 23 so that the first and main contact will be at a line or along a narrow annular surface at and in the case of the annular surface closely adjoining the edge 21. The pressure of the fluid content exerted within the concavity 22 upon the outer walls (edges) will tend to fold the edges 21 outwardly into firmer contact with the engaging surfaces.

The rings 20 are made of resilient material such as a high grade steel or steel alloy, such as a high carbon steel, Monel metal, vanadium steel, nickel, steel or chrome-nickel steel.

Each of these rings 20 forms a continuous seal and in some conditions in practice would be sufficient for a complete seal between the meeting conduits, whether pipe sections, pipe section and fitting flange or fitting flanges. However, these rings require centering and because of the danger of leakage past a single ring a plurality should be used. They, therefore, require spacing or centering devices and the spacing should provide for uniform spacing as the results are attained when the rings are concentric.

Assuming that a plurality of rings is to be used, as will normally be the case, I have shown a very desirable number, three rings and have shown different spacing means by which uniformity in spacing may be attained initially and by which the spacing may be maintained.

I show a variety of forms of spacers 25, $25'$, $25^2$ engaging the inner circumference of one ring and the outer circumference of the adjoining ring and preferably, though not necessarily, resting against the surface instead of entering the body of the ring in order to permit the insertion of the spacers freely without regard to any exact points about the circumferences of the rings.

The most convenient form of ring construction to facilitate this known to me makes use of the groove or convexity 22 used in the interior of each ring for the purpose of improving the seal and forms a convexity or rib 24 about the outer circumference of each ring. By this construction annular spacing material between may be made of curved iron or angle iron or an equivalent, fitting the rib of the curve or angle against the interior of the ring concavity and the groove or hollow of the curve or angle against the rib of the ring, requiring a minimum of material and adapting to pressed metal spacer construction.

Evidently the spacers may be individual, whether resting against the surface merely as in Figures 3, $3a$, 7 and 8, or entering holes in the rings as shown in $3b$, or may be connected about the circumference as in Figure 5.

In the form shown in Figures $3a$, 7 and 8, a flat strip is shown. This is preferably of spring material. It must be capable of withstanding the temperatures to which it is to be subjected and even if not of spring material should yield sufficiently to allow insertion without looseness. It is bent so that at the spacing intended its point 26 will rest in the groove or ring while an intermediate portion 27 rests against the rib of the adjoining ring. This portion 27 is slitted at 28 to straddle the rib.

In the form shown in Figure $3b$ the spacer is attached independently of the grooved or ribbed character of the adjoining surfaces by pins 29 engaging in openings 30 in the adjoining rings. This has one advantage that the spacer $25'$ may be permanently attached to one of the rings, preferably the outer, avoiding loss. In this event it is not necessary to provide any attachment with the inner ring.

In the form shown at $25^2$ in Figures 5 and 11 an angle 31 is bent to provide alternating swells 32 and depressions 33 with the convex surface 34 facing outwardly so as to enter the concavity of the outer rings and the concave surface 32 facing inwardly so as to straddle a rib on the inner ring.

Figures 12 and 13 correspond with the figures in the copending application by me Serial No. 59,462 and are here inserted for the purpose merely of showing structure in solid form similar to the composite disk made by me and with which, as the closest solid form of disk known to me, the composite disk may be compared.

The inner ring may as shown seal with the actual end of the pipe as distinguished from sealing against the flange so as to reduce the pressure effected upon the joint between the pipe and its flange and to reduce leakage through the joint in case of a faulty joint. Whether the inner ring seal against the pipe or not each ring successively reduces the pressure available for causing leakage past the next so that the series of rings becomes additionally effected for this reason.

It is obvious that the initial parallelism or flaring of the adjoining faces of the flanges may be designed to combine with the rings as chosen so as to secure uniform tightness upon the rings when the bolts have been tightened to the intended degree or to secure a gradient of pressure upon the successive rings, either a higher pressure upon relatively inner rings to give maximum loss in pressure there and a maximum of resilience in the pressure or a higher pressure upon relatively outer rings upon the theory that a maximum of firmness of contact is thus secured, as may be desired.

In operation the rings are assembled and are held in position by any convenient outside support while the flange bolts are being tightened sufficiently to hold them in position. The bolts are then tightened to the desired extent.

In referring to the firmness of contact above it was not my intention to indicate that the joint must be rigid to be tight as one of the considerable advantages of my joint lies in the spring within the material of the individual rings. From a condition of normal tightness they will accommodate themselves to considerable rocking at the joints, by reason of the spring in the rings to axial pressure. They will also permit slight further compression between flanges on one side of the pipe and will follow the flange with slight loosening between the flanges on the other side of the pipe to maintain a tight joint with movement of the pipe through tilting the sections and thus diverging adjoining sections from true alignment.

As the replacement of a defective joint in a larger size high pressure covered steam pipe often costs in excess of $1,000.00 the importance of reliable joints can be appreciated.

It will be obvious that in view of my disclosure herein other forms and structure will be suggested to those skilled in the art by which all or a part of the benefit of my invention may be secured to meet real or supposed special needs, to satisfy the whim of the designer or to secure the results without copying my form. It is my purpose therefore to include herein all such forms and structures as fall reasonably within the spirit and scope of my invention.

Having thus described my invention, what I claim as new and desire to secure by Letters Patent is:—

1. A metallic annulus for sealing between facing flanges having its only contact surfaces in the form of undercut spring contact edges directed toward the interior of the disk so that the pressure from the interior outwardly engages the undercut part of the edges.

2. A gasket for sealing between facing annular members, comprising separate concentric annular sealing members each concave upon its interior and cut away at its sides outwardly to concentrate pressure at the edge adjoining the concavity, in combination with spacers for holding the members in concentric position.

3. A solid sealing contact annulus of spring material having undercut contact portions at its inner edge forming its only contact portions, its lateral faces converging toward the outside and a convex outside edge.

4. A composite annulus for sealing between flanged joints which consists in a plurality of sealing disks concaved interiorly and converging outwardly at their exteriors to provide undercut sealing edges forming their only sealing edges in combination with spacers between the disks maintaining them in coaxial positions.

5. A metallic annulus for sealing between flanges in pipe joints, having a concaved internal face, sharp sealing edges adjoining this face and sides converging outwardly from the sealing edges.

6. In a composite disk for flange joints, the combination of a pair of concentric annuli, one within the other, each having its interior concaved and its exterior converging outwardly from the edges of the concavity to form sharp undercut sealing edges adjacent the concaved inner faces, in combination with spacers between the annuli.

7. A metallic gasket adapted to engage and seal axially against two facing annular surfaces comprising a plurality of separate and distinct members of different diameters in combination with spring supports engaging the members circumferentially, narrower in axial dimension than the distance between the face engaging surfaces of the individual sealing members and holding the members in concentric position.

8. A metallic gasket adapted to engage and directly to seal between two facing annular surfaces comprising a plurality of separate and distinct spaced annular sealing members of different diameters, each having engaging surfaces on opposite sides of the member axially in combination with separate spacers insertable at circumferential intervals between the members, holding them in concentric position and narrower axially than the axial dimension of the separate sealing members.

9. A gasket adapted directly to seal axially against facing annular surfaces, comprising inner and outer separate annular sealing members, each having sealing surfaces on opposite sides axially adapted to engage the respective facing surfaces, the members having radially adjoining faces, convex and concave respectively, in combination with radially operating spring spacers between them, concave to fit over the convexity of the one ring and convex to fit into the concavity of the other.

10. In a composite disk for flanged joints, a pair of metallic concentric discs of different diameter, one within the other, each having its interior concaved to form sharp undercut resilient axially engaging sealing edges separated more widely along the axis than the axial thickness of the rest of the disk and metallic spacing means between the disks engaging the outer diameter of the inner disk fitting within the concavity of the outer disk and thinner axially than either disk.

11. A composite metallic disk for flanged joints comprising a pair of concentric disks, one within the other, each having contact surfaces on opposite sides axially and metallic spacing means narrower than the disks and engaging them at intervals to hold them in concentric position.

WILLIAM F. OBERHUBER.